US010546451B2

(12) United States Patent
Nakamura et al.

(10) Patent No.: US 10,546,451 B2
(45) Date of Patent: *Jan. 28, 2020

(54) GAME MACHINE, AND CONTROL METHOD OF CONTROLLING COMPUTER AND COMPUTER PROGRAM USED THEREFOR

(71) Applicant: Konami Gaming, Inc., Las Vegas, NV (US)

(72) Inventors: Daisuke Nakamura, Zama (JP); Hidetomo Yamashita, Zama (JP); Hayato Mizue, Zama (JP); Hiromitsu Negishi, Zama (JP)

(73) Assignee: Konami Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/911,572

(22) Filed: Mar. 5, 2018

(65) Prior Publication Data

US 2018/0197368 A1 Jul. 12, 2018

Related U.S. Application Data

(63) Continuation of application No. 15/270,394, filed on Sep. 20, 2016, now Pat. No. 9,947,172, which is a (Continued)

(30) Foreign Application Priority Data

Aug. 29, 2012 (AU) ................................ 2012216490

(51) Int. Cl.

*G06F 17/00* (2019.01)
*G07F 17/32* (2006.01)
*G07F 17/34* (2006.01)

(52) U.S. Cl.

CPC ...... *G07F 17/3213* (2013.01); *G07F 17/3246* (2013.01); *G07F 17/3265* (2013.01); *G07F 17/34* (2013.01)

(58) Field of Classification Search

CPC .. G07F 17/3213; G07F 17/34; G07F 17/3246; G07F 17/3265

See application file for complete search history.

(56) References Cited

U.S. PATENT DOCUMENTS 6,413,162 B1 7/2002 Baerlocher et al.
6,905,408 B2 * 6/2005 Inoue .................. G07F 17/3213 273/143 R (Continued)

FOREIGN PATENT DOCUMENTS

EP 2189954 A1 5/2010
JP 2641767 B 3/1991

(Continued)

OTHER PUBLICATIONS

Super Jackpot Party Free Online Slot Game, http://www.youtube.com/watch?v+AbSbLxArkaQ, 2 pages, downloaded on Feb. 19, 2014.

(Continued)

*Primary Examiner* — Dmitry Suhol
*Assistant Examiner* — Carl V Larsen
(74) *Attorney, Agent, or Firm* — Howard & Howard Attorneys PLLC

(57) ABSTRACT

A game machine includes a display device that displays a game screen in which virtual reels formed by symbols are arranged so as to correspond one-to-one to cells as symbol stop positions. And, a game machine determines the symbol to stop in each cell through drawing, and controls a movement to change the symbol and a stop of the movement for each virtual reel based on a drawing result. Furthermore, a (Continued)

game machine determines a number of specific symbols that stop in the cells, and controls a movement of each virtual reel, which causes the specific symbols to appear in the cells, as one virtual reel group and a stop of the movement in units of virtual reel group.

24 Claims, 14 Drawing Sheets

Related U.S. Application Data continuation of application No. 13/974,494, filed on Aug. 23, 2013, now Pat. No. 9,478,107.

(56) References Cited

U.S. PATENT DOCUMENTS

| | | | | |
|---|---|---|---|---|
| 7,753,773 | B2 | 7/2010 | Baerlocher et al. | |
| 8,574,059 | B2 | 11/2013 | Rodgers et al. | |
| 2004/0224751 | A1 | 11/2004 | Jaffe et al. | |
| 2005/0054418 | A1 | 3/2005 | Baerlocher | |
| 2006/0084498 | A1 | 4/2006 | Baerlocher et al. | |
| 2007/0060344 | A1* | 3/2007 | Watkins | G07F 17/32 463/31 |
| 2007/0298861 | A1 | 12/2007 | Englman et al. | |
| 2008/0102928 | A1* | 5/2008 | Daley | G07F 17/32 463/20 |
| 2009/0082083 | A1 | 3/2009 | Wilson et al. | |
| 2009/0227357 | A1 | 9/2009 | Rasmussen | |
| 2010/0190545 | A1 | 7/2010 | Lauzon et al. | |
| 2010/0210343 | A1* | 8/2010 | Englman | G07F 17/32 463/20 |
| 2011/0136562 | A1 | 6/2011 | Loat et al. | |
| 2011/0223984 | A1 | 9/2011 | Mizue | |
| 2011/0223985 | A1 | 9/2011 | Mizue | |
| 2011/0294563 | A1 | 12/2011 | Jaffe | |
| 2012/0142410 | A1 | 6/2012 | Olive et al. | |
| 2013/0244748 | A1 | 9/2013 | Kitamura et al. | |
| 2013/0260858 | A1 | 10/2013 | Hirato et al. | |
| 2013/0310170 | A1 | 11/2013 | Joko et al. | |
| 2014/0066164 | A1 | 3/2014 | Okada et al. | |
| 2014/0080571 | A1 | 3/2014 | Garretsen et al. | |

FOREIGN PATENT DOCUMENTS

| | | | |
|---|---|---|---|
| JP | 2002028279 | A | 1/2002 |
| JP | 2004-065813 | A | 3/2004 |
| JP | 2004-329-297 | A2 | 11/2004 |
| JP | 2007-143882 | A | 6/2007 |
| JP | 2007-167226 | A | 7/2007 |
| JP | 2007-275135 | A | 10/2007 |
| JP | 2008-80108 | A | 4/2008 |
| JP | 2008-161452 | A | 7/2008 |
| JP | 2010-011950 | A | 1/2010 |
| JP | 2011-206305 | A | 10/2011 |
| WO | 96/08295 | A1 | 3/1996 |
| WO | 2012064334 | A1 | 5/2012 |

OTHER PUBLICATIONS

Kaiji, Pachislot Sure Victory Guide MAX Feb. 2005, Byakuya-Shobo Co., Ltd., Feb. 1, 2005, pp. 14-19 (reference showing the well-known art).

Notice of Reasons for Rejection (English and Japanese), (JP Patent Japanese P2016-201089), Dispatch Date: Mar. 14, 2017.

Notice of Allowance (JP Patent Application No. 2016-201089); Dispatch Date: Sep. 19, 2017.

The Third Office Action (CN Application/Patent No. 201380047977.2); dated Oct. 30, 2017.

* cited by examiner

Fig. 5

23a

| Reel A | Reel B | Reel C | Reel D | Reel E | Reel F | Reel G | Inner Reel |
|---|---|---|---|---|---|---|---|
| Q | A | K | PIC—b | PIC—d | PIC—d | PIC—d | Wild |
| K | Wild | Wild | Wild | Wild | Wild | Wild | PIC—a |
| A | K | A | K | J | J | J | PIC—b |
| J | PIC—b | PIC—b | PIC—c | PIC—c | PIC—c | PIC—c | PIC—c |
| PIC—b | Q | PIC—d | Inner | Inner | Inner | Inner | PIC—d |
| ⋮ | ⋮ | ⋮ | ⋮ | ⋮ | ⋮ | ⋮ | ⋮ |

Fig. 6

23b

| 1st column | 2nd column | 3rd column | 4th column | 5th column |
| --- | --- | --- | --- | --- |
| Reel A | Reel B | Reel C | Reel D | Reel E |
| Reel A | Reel B | Reel C | Reel D | Reel F |
| Reel A | Reel B | Reel C | Reel D | Reel G |

Fig. 7

23c

| | |
|---|---|
| (00000) | 9500 |
| (In0000) | 10 |
| (0In000) | 10 |
| (00In00) | 10 |
| (000In0) | 20 |
| (0000In) | 30 |
| . | . . |

Fig. 8

23bs

| 1st column | 2nd column | 3rd column | 4th column | 5th column |
|---|---|---|---|---|
| Inner | Reel B | Reel C | Reel D | Reel E |
| Inner | Reel B | Reel C | Reel D | Reel F |
| Inner | Reel B | Reel C | Reel D | Reel G |

GAME MACHINE, AND CONTROL METHOD OF CONTROLLING COMPUTER AND COMPUTER PROGRAM USED THEREFOR

CROSS-REFERENCE TO RELATED APPLICATION

This application is a continuation of U.S. patent application Ser. No. 15/270,394, filed Sep. 20, 2016, which claims priority to U.S. patent application Ser. No. 13/974,494, filed Aug. 23, 2013, which claims priority to Australian Patent Application No. 2012216490, filed on Aug. 29, 2012, the disclosures of which are incorporated by reference in their entirety.

TECHNICAL FIELD

The present invention relates to a game machine or the like in which a plurality of cells as symbol stop positions and a plurality of symbol lines are arranged so that a portion of symbols of each symbol line appears in respective cells, each symbol line moves so as to change the portion of the symbols, and a special privilege is granted if a predetermined winning arrangement is formed by the symbols appearing in the cells when the movement stops.

BACKGROUND ART

There is a game machine in which a plurality of cells serving as symbol stop positions and a plurality of symbol lines are arranged so that a portion of symbols of each symbol line appears in the respective cells, each symbol line moves so as to change the portion of the symbols, and a special privilege is granted if a predetermined winning arrangement is formed by the symbols appearing in the cells when the movement stops. As a game machine like this, there is known a game machine that provides a game in which, when a predetermined condition is satisfied, the same symbols are arranged in a portion of cells in advance, and an arrangement of the same symbols is maintained while symbols of other cells are changed (e.g., see Patent Literature 1).

Patent Literature 1: US Patent Application Publication No. 2010/0304831.

SUMMARY OF INVENTION

In one aspect of the present invention a gaming machine for conducting a game is provided. The game machine includes a display device, a user input device, and a control unit. The display device is configured to display a cell matrix including a plurality of cells. Each cell indicates a portion of a virtual reel respectively adopted to the cell. The virtual reel deploys a virtual reel strip having a plurality of aligned symbols. The user input device is configured to generate a signal indicative of player input. The control unit is connected to the display device and the user input device and is configured to accept the signal from the user input device and initiate the game. The control unit independently determines a symbol to be indicated in each cell of the cell matrix as an outcome of the game and identifies a first plurality of virtual reels having related symbols in the outcome of the game. The control unit further to responsively spins and/or stops the first plurality of the virtual reels in a first manner and spins and/or stops a second plurality of the virtual reels in a second manner to indicate the determined symbols in the cell matrix.

In a second aspect of the present invention, a method for conducting a game using a gaming machine is provided. The game machine includes a display device, a user input device and a control unit. The display device is configured to display a cell matrix including a plurality of cells. Each cell indicates a portion of a virtual reel respectively adopted to the cell. The virtual reel deploys a virtual reel strip having a plurality of aligned symbols. The method including the steps of generating, by the user input device, a signal indicative of player input and accepting the signal from the user input device and initiating the game. The method also includes the steps of independently determining a symbol to be indicated in each cell of the cell matrix as an outcome of the game and identifying a first plurality of virtual reels having related symbols in the outcome of the game. The method further includes the steps of responsively spinning and/or stopping the first plurality of the virtual reels in a first manner and spinning and/or stopping a second plurality of the virtual reels in a second manner, to indicate the determined symbols in the cell matrix.

In a third aspect of the present invention, a non-transitory computer usable medium having a computer readable program embodied therein is provided. The program causes a computer to function as a display device, a user input device, and a control unit. The display device is configured to display a cell matrix including a plurality of cells. Each cell indicates a portion of a virtual reel respectively adopted to the cell. The virtual reel deploys a virtual reel strip having a plurality of aligned symbols. The user input device is configured to generate a signal indicative of player input. The control unit is connected to the display device and the user input device and is configured to accept the signal from the user input device and initiate the game. The control unit independently determines a symbol to be indicated in each cell of the cell matrix as an outcome of the game and identifies a first plurality of virtual reels having related symbols in the outcome of the game. The control unit further to responsively spins and/or stops the first plurality of the virtual reels in a first manner and spins and/or stops a second plurality of the virtual reels in a second manner to indicate the determined symbols in the cell matrix.

Technical Problem

In a game machine as in Patent Literature 1, when the same symbols form a predetermined winning arrangement, a special privilege is often granted. In the game machine of Patent Literature 1, the same symbols are arranged in advance. Accordingly, a possibility that the special privilege is granted is high. Accordingly, expectations of players can be improved. Meanwhile, respective symbols arranged in the cells in advance do not move, unlike symbols of other cells. Accordingly, loss of interest in the game may result.

Accordingly, an object of the present invention is to provide a game machine or the like capable of suppressing loss of interest in the game while improving expectations of player.

Solution to Problem

In order to solve the above problems, the game machine of the present invention is a game machine in which a plurality of cells serving as symbol stop positions and a plurality of symbol lines are arranged so that a portion of symbols of each symbol line appears in the respective cells, each symbol line moves so as to change appearing symbols, and a special privilege is granted if the predetermined winning arrangement is formed by the symbols appearing in the cells when the movement stops, wherein the game machine comprises: a display device that displays a game screen in which the plurality of symbol lines are arranged so as to correspond one-to-one to the plurality of cells; a symbol determination device that determines the symbol to stop in each cell through drawing; and a symbol line control device that controls a movement to change the symbol and a stop of the movement for each symbol line based on a drawing result of the symbol determination device; and wherein the symbol line control device further comprises a symbol number determination device that determines a number of specific symbols related to the predetermined winning arrangement among symbols that stop in the cells based on the determination result of the symbol determination device, and a symbol line group control device that controls a movement of each symbol line, which causes the specific symbols to appear in the cells, as one symbol line group and a stop of the movement in units of symbol line group when the number of specific symbols is equal to or more than a predetermined number based on a determination result of the symbol number determination device.

Or, in order to solve the above problems, the game machine of the present invention is a game machine in which a plurality of cells serving as symbol stop positions and a plurality of symbol lines are arranged so that a portion of symbols of each symbol line appears in the cells, each symbol line moves so as to change the portion of the symbols, and a special privilege is granted if the predetermined winning arrangement is formed by the symbols appearing in the cells when the movement stops, and wherein the game machine comprises: a symbol determination device that determines the symbol to stop in each cell through drawing; a symbol number determination device that determines a number of specific symbols related to the predetermined winning arrangement among the symbols that stop in the cells based on a drawing result of the symbol determination device; and a symbol line group control device that controls a movement of a symbol line group which is formed by the symbol lines causing the specific symbols to appear in the cells as one symbol line group and a stop of the movement in units of symbol line group when the number of specific symbols is equal to or more than a predetermined number based on a determination result of the symbol number determination device.

According to the present invention, when the number of specific symbols is equal to or more than a predetermined number, each symbol line that causes the symbols to appear in the respective cells are controlled as one symbol line group. That is, the respective specific symbols appear as one symbol group in the cells. The specific symbols are associated with a predetermined winning arrangement. Accordingly, by causing the respective specific symbols to appear as a symbol group in the cells, expectations of player can be improved. Furthermore, since the respective symbol lines that cause the specific symbols to appear are controlled as one symbol line, symbols of cells in which the symbol group is to be arranged are also changed in units of symbol line group. Accordingly, loss of interest in the game can be avoided. That is, when the number of specific symbols is equal to or more than a predetermined number, these are controlled as a symbol line group. Thus, it is possible to suppress loss of interest in the game while improving player expectations.

Also, in order to solve the above problems, the control method of controlling a computer of the present invention is a control method of controlling a computer incorporated in a game machine in which a plurality of cells serving as symbol stop positions and a plurality of symbol lines are arranged so that a portion of symbols of each symbol line appears in the cells, each symbol line moves so as to change the portion of the symbols, and a special privilege is granted if the predetermined winning arrangement is formed by the symbols appearing in the cells when the movement stops, and wherein the control method of controlling the computer comprises the steps: a symbol determination step that determines the symbol to stop in each cell through drawing; a symbol number determination step that determines a number of specific symbols related to the predetermined winning arrangement among the symbols that stop in the cells based on a drawing result of the symbol determination step; and a symbol line group control step that controls a movement of a symbol line group which is formed by the symbol lines causing the specific symbols to appear in the cells as one symbol line group and a stop of the movement in units of symbol line group when the number of specific symbols is equal to or more than a predetermined number based on a determination result of the symbol number determination step.

Further, in order to solve the above problems, a computer program for a game machine of the present invention is a computer program for a game machine in which a plurality of cells serving as symbol stop positions and a plurality of symbol lines are arranged so that a portion of symbols of each symbol line appears in the cells, each symbol line moves so as to change the portion of the symbols, and a special privilege is granted if the predetermined winning arrangement is formed by the symbols appearing in the cells when the movement stops, and wherein the computer program is configured so as to cause a computer which is incorporated in the game machine to serve as: a symbol determination device that determines the symbol to stop in each cell through drawing; a symbol number determination device that determines a number of specific symbols related to the predetermined winning arrangement among the symbols that stop in the cells based on a drawing result of the symbol determination device; and a symbol line group control device that controls a movement of a symbol line group which is formed by the symbol lines causing the specific symbols to appear in the cells as one symbol line group and a stop of the movement in units of symbol line group when the number of specific symbols is equal to or more than a predetermined number based on a determination result of the symbol number determination device. According to the control method of controlling the computer or the computer program of the present invention, it is possible to realize the game machine of the present invention.

BRIEF DESCRIPTION OF DRAWINGS

FIG. 5 is a diagram illustrating an example of content of reel data.

FIG. 6 is a diagram illustrating an example of content of reel arrangement data.

FIG. 7 is a diagram illustrating an example of content of mystery reel probability data.

FIG. 8 is a diagram illustrating an example of reel arrangement data for mystery reel arrangement.

DESCRIPTION OF EMBODIMENTS

Figure 1:
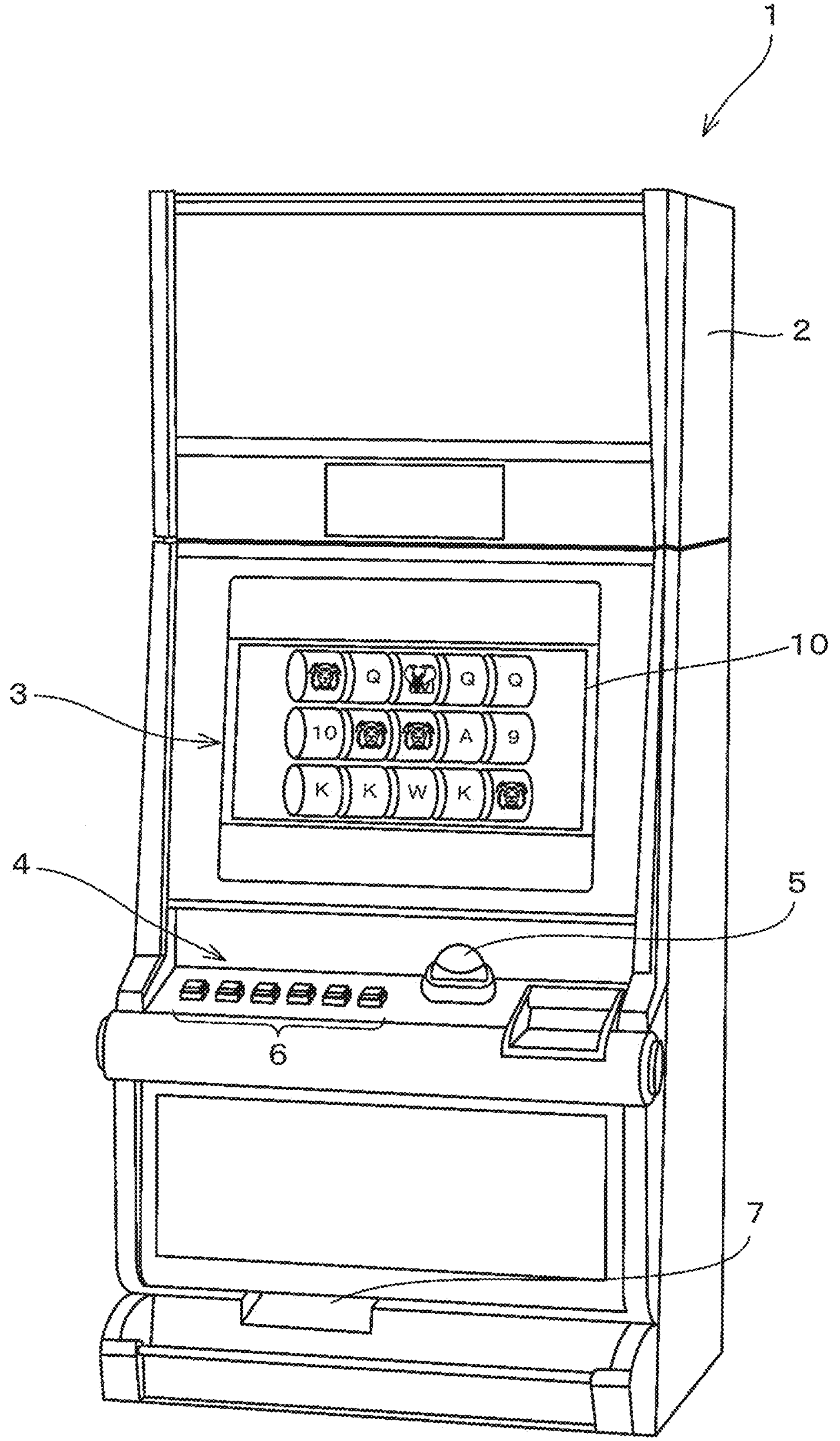
FIG. 1 is a view illustrating the appearance of a game machine according to an embodiment of the present invention.

Hereinafter, a game machine according to an embodiment of the present invention will be described with reference to the drawings. FIG. 1 is a view illustrating the appearance of a game machine according to an embodiment of the present invention. A game machine 1 is configured as a slot machine-type game machine. As illustrated in FIG. 1, the game machine 1 includes a housing 2. A display device 3 is provided on a front surface of the housing 2. As an example of the display device 3, a liquid crystal display device is used.

A control panel 4 is provided below the display device 3. A coin slot 5 and a manipulation device 6 are provided in the control panel 4. The manipulation device 6 includes, for example, a manipulation member such as a button switch for a betting manipulation and various other manipulations. Further, a coin outlet 7 is provided below the control panel 4.

Figure 2:
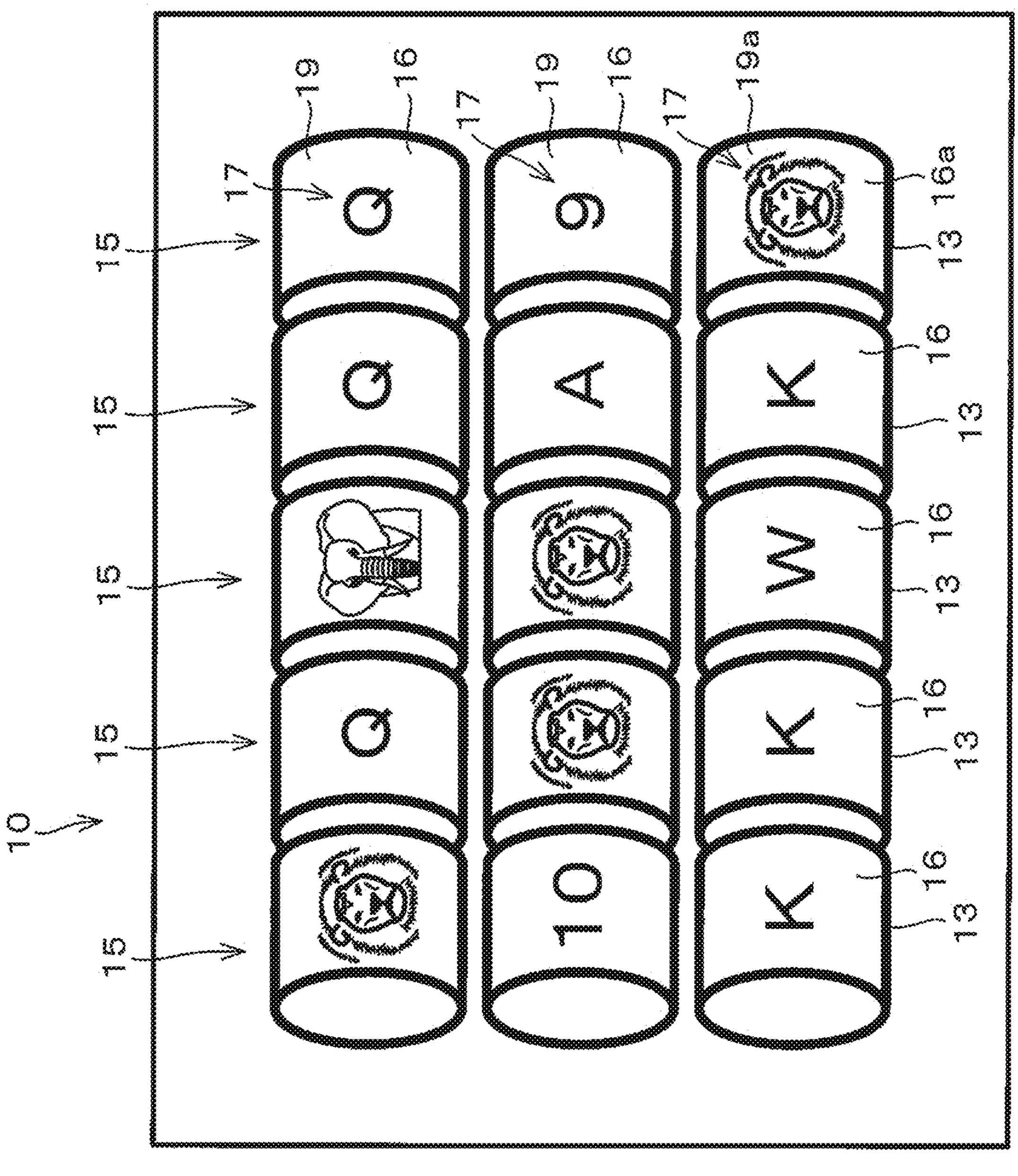
FIG. 2 is a schematic diagram illustrating an example of a game screen.

A game screen 10 for a slot game is displayed on the display device 3. FIG. 2 is a schematic diagram illustrating an example of the game screen 10. As illustrated in FIG. 2, a plurality of cells 13 is included in the game screen 10. The cells 13 are aligned in a predetermined arrangement. Specifically, a matrix arrangement is adopted as the predetermined arrangement. That is, the plurality of cells 13 is arranged in a matrix shape in a vertical direction (up and down direction) and a horizontal direction of the game screen 10.

In the example of FIG. 2, a total of fifteen cells 13 of three rows in the vertical direction and five columns in the horizontal direction are arranged.

Virtual reel 16 serving as symbol lines corresponds to each cell 13 one-by-one. That is, the plurality of virtual reels 16 corresponding to the plurality of cells 13 is prepared. Accordingly, in the example of FIG. 2, a total of fifteen virtual reels 16 corresponding to a total of fifteen cells 13 are prepared. The virtual reel 16 is configured by aligning a predetermined number of symbol areas 19 in one direction. A size of one symbol area 19 is equal to a size of each cell 13. In each cell 13, only a portion of each virtual reel 16 is displayed. More specifically, in each cell 13, any one of the predetermined number of symbol areas 19 included in each virtual reel 16 is displayed.

In each symbol area 19, any one of multiple types of symbols 17 is fixed and arranged. A numeral, a letter, or a figure such as a lion, an elephant, or a map is appropriately adopted as an example of the symbol 17. In addition, the number of symbol areas 19 included in one virtual reel 16 may be an appropriate number. Further, arrangements of the symbols 17 of the fifteen virtual reels 16 may be different from each other or the virtual reels 16 may have the same arrangement reels.

In the example of FIG. 2, an alignment direction of the respective cells 13 in the cell column 15 matches an alignment direction of the symbols 17 in the virtual reel 16. In addition, the virtual reel 16 ideally has a cylindrical body shape, like a mechanical reel in which symbols are arranged around an outer circumference of a cylindrical body.

When the game starts, each virtual reel 16 is scrolled downward in each cell 13. The scroll is performed so as to virtually represent movement of the symbol when a physical reel is rotated, by replacing it with an image display. Additionally, at a predetermined stop time, each virtual reel 16 stops so that one symbol area 19 appears in one cell 13. That is, a stop position of scrolling of the virtual reel 16 (which may be abbreviated as a stop position of the virtual reel 16) is controlled in units of cells. Thus, each cell functions as a symbol stop position.

Further, a variable symbol area 19*a* is included as one of symbol areas 19 in each virtual reel 16. The variable symbol area 19*a* is an area in which the arranged symbol 17 is changed, unlike the other symbol area 19. More specifically, the variable symbol area 19*a* is associated with an inner reel 16*a* serving as a particular symbol line. The inner reel 16*a* is a virtually realized reel, similar to the virtual reel 16. Further, the inner reel 16*a* is ideally similar to the virtual reel 16.

Figure 3:
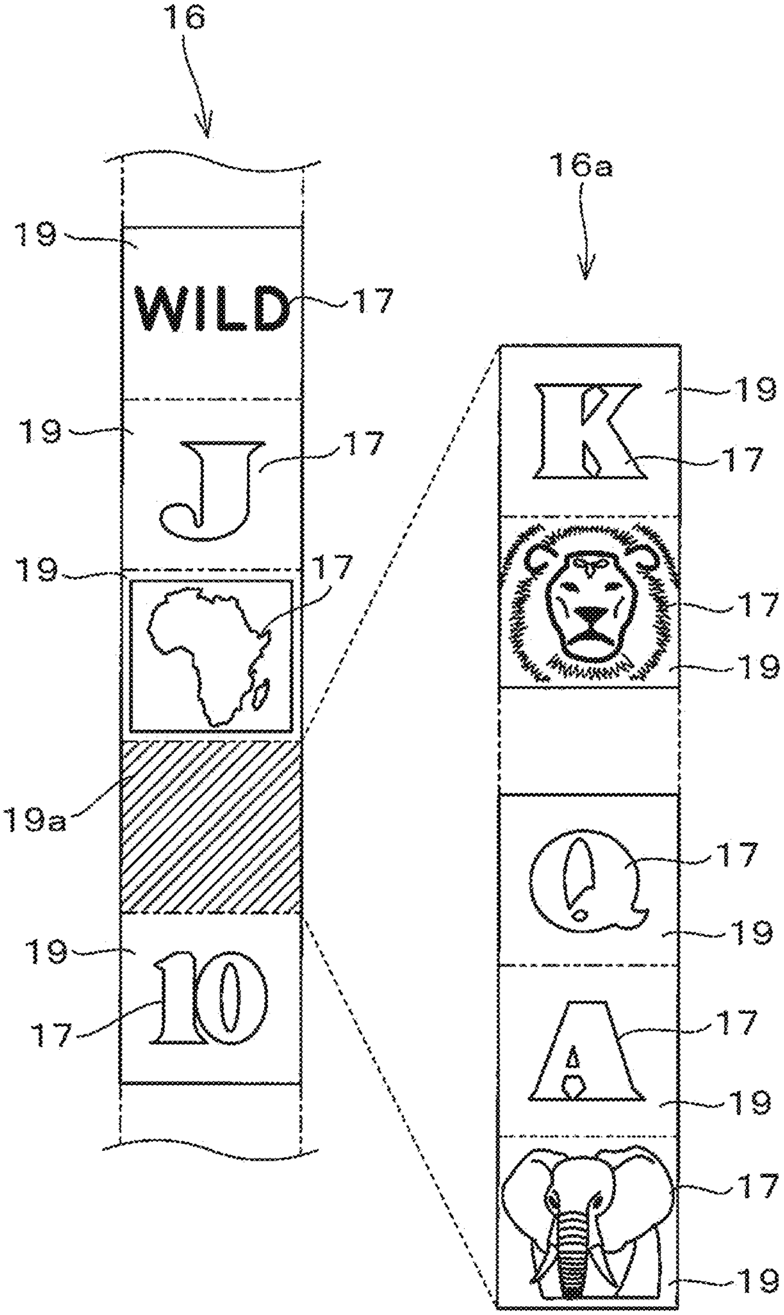
FIG. 3 is an illustrative diagram illustrating a relationship of a virtual reel and an inner reel.

FIG. 3 is an illustrative diagram illustrating a relationship between the virtual reel 16 and the inner reel 16*a*. Further, FIG. 3 illustrates a state in which the virtual reel 16 and the inner reel 16*a* are partially developed. As illustrated in FIG. 3, the inner reel 16*a* is configured by aligning a predetermined number of symbol areas 19 in one direction, similar to the virtual reel 16. Additionally, any one of the predetermined number of symbol areas 19 included in the inner reel 16*a* is arranged in the variable symbol area 19*a*. In other words, any one symbol 17 among symbols 17 arranged in the respective symbol areas 19 of the inner reel 16*a* is displayed in the variable symbol area 19*a*. Ideally, the virtual reel 16 is arranged outside the inner reel 16*a* around an outer circumference of the inner reel 16*a*. That is, the virtual reel 16 and the inner reel 16*a* are associated so as to constitute a so-called dual reel (a dual structure reel configured of an outer reel and an inner reel). Accordingly, the variable symbol area 19*a* ideally functions as a window for causing the symbol 17 of the inner reel 16*a* located inside to appear in the virtual reel 16.

The common inner reel 16*a* is used in the variable symbol areas 19*a* of the respective virtual reels 16. That is, the arrangements of the symbols 17 of the inner reels 16*a* used in the virtual reels 16 are the same. When the game starts, the inner reel 16*a* is scrolled downward in each cell 13, similar to the virtual reel 16. That is, scroll directions of the virtual reel 16 and the inner reel 16*a* match each other. Accordingly, when the virtual reel 16 and the inner reel 16*a* are scrolled at the same speed, there is formed a state in that the inner reel 16*a* is stationary relative to the virtual reel 16. In this state, the symbol 17 of the inner reel 16*a* arranged in the variable symbol area 19*a* is fixed. That is, in this state, the symbol 17 of the inner reel 16*a* arranged in the variable symbol area 19*a* is unchanged. Further, the inner reel 16*a* stops so that one symbol 17 is arranged in the variable symbol area 19*a* in a predetermined stop time, similar to the virtual reel 16. This stop is executed so as to be synchronized between the inner reels 16*a* of the virtual reels 16. That is, each inner reel 16*a* corresponding to each virtual reel 16 stop so as to cause the same symbols 17 to appear in the variable symbol areas 19*a* of the virtual reels 16 at the same time. Accordingly, the same symbols 17 are arranged in all the variable symbol areas 19*a* of the virtual reels 16. Further, the symbol 17 of the inner reel 16*a* arranged in each cell 13 functions as a specific symbol of the present invention.

Further, different stop times may be adopted between the virtual reel 16 and the inner reel 16*a*. That is, the stop time may be different between the virtual reel 16 and the inner reel 16*a*. Accordingly, when the virtual reel 16 stops so that the variable symbol area 19*a* appears in the cell 13, the inner reel 16*a* may be continuously rotated while scrolling of the virtual reel 16 stops. In this case, the virtual reel 16 corresponding to the cell 13 is represented as if it is continuously rotated. Further, in this case, a particular rendition is executed. Details of the particular rendition will be described below.

Furthermore, a mystery reel serving as another symbol line may be associated with each cell 13. The mystery reel is a reel having a same arrangement of the symbols 17 as the inner reel 16*a*. However, the mystery reel is used instead of the virtual reel 16. Ideally, the mystery reel is arranged outside the virtual reel 16 around an outer circumference so as to cover the virtual reel 16. That is, when the mystery reel is arranged, a triple ring (a reel having a three-layered structure) in which, ideally, the mystery reel, the virtual reel 16, and the inner reel 16*a* are sequentially arranged from an outer side, is used for the cell 13.

Any one of the symbols 17 of the mystery reel is arranged in the cell 13 with which the mystery reel is associated. Further, the mystery reel corresponds to the scrolling and stopping of the inner reel 16*a*. That is, movements of the mystery reel and the inner reel 16*a* are synchronized to each other. Accordingly, the symbol 17 arranged in the variable symbol area 19*a* matches the symbol 17 arranged in the cell 13 for which the mystery reel is used. Accordingly, ideally, the mystery reel may be defined as the inner reel 16*a* arranged outside the virtual reel 16. Further, the mystery reel is arranged in units of cell column 15. That is, when the mystery reel is arranged, the mystery reel is arranged to be common to the respective cells 13 in the cell column 15. Further, the cell column 15 in which the mystery reel is arranged is determined by drawing.

Figure 4:
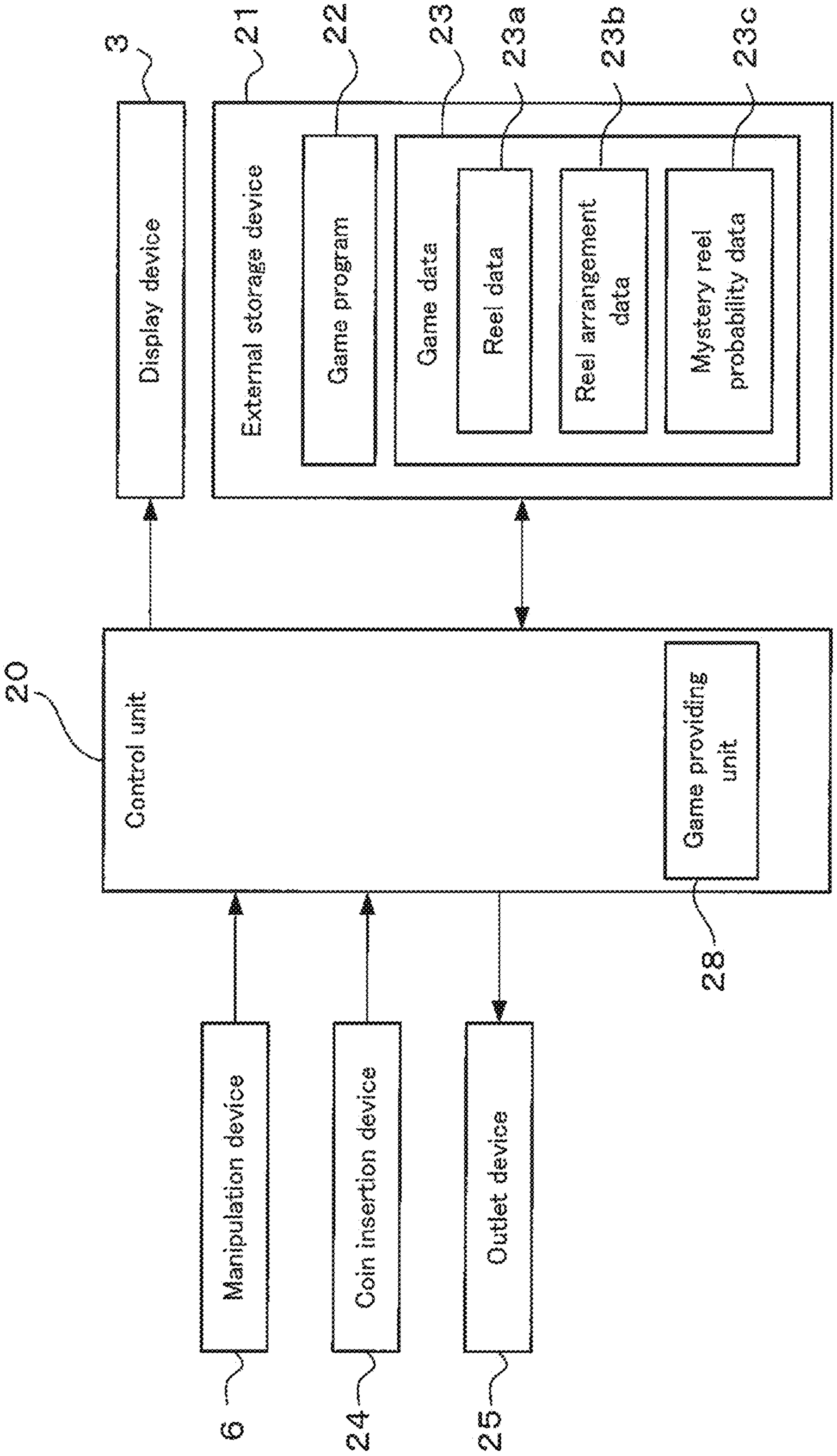
FIG. 4 is a functional block diagram illustrating a schematic configuration of a control system of a game machine.

Next, a configuration of a control system of the game machine 1 will be described with reference to FIG. 4. FIG. 4 is a functional block diagram illustrating a schematic configuration of the control system of the game machine 1. As illustrated in FIG. 4, a control unit 20 and an external storage device 21 are provided in the game machine 1. The control unit 20 is configured as a computer unit including a microprocessor and other peripheral devices such as a main storage device necessary for operation of the microprocessor or the like.

The external storage device 21 is connected to the control unit 20. As the external storage device 21, for example, a storage medium capable of keeping storage even when the storage medium is not powered is used, such as a magnetic storage medium including a hard disk or the like, an optical storage medium including a DVD-ROM or the like, or a nonvolatile semiconductor memory including an EEPROM or the like.

A game program 22 and game data 23 are stored in the external storage device 21. The game program 22 is a program necessary for the game machine 1 to execute a slot game. The game data 23 is various data used when the game program 22 is executed. The game program 22 is appropriately read and executed by the control unit 20. The game data 23 is appropriately read and referenced by the control unit 20. In addition, the game program 22 includes various program modules necessary to execute the game, which are, however, not shown.

In the game data 23, for example, reel data 23*a*, reel arrangement data 23*b*, and mystery reel probability data 23*c* are included. Details of the data will be described below. In addition, various data such as sound effect data and dividend data is also included in the game data 23, but is not shown.

By the execution of the game program 22, a game providing unit 28 is provided in the control unit 20. The game providing unit 28 executes a process necessary for the game machine 1 to provide the slot game. For example, the game providing unit 28 executes a process for generating a random number having predetermined digits, and a process for drawing the symbol 17 to be arranged in each cell 13 using the random number. Further, the game providing unit 28 executes, for example, a process for scrolling and stopping the virtual reel 16 and the inner reel 16*a* in order to arrange the respective symbols 17 as a drawing result in the cells 13. The game providing unit 28 also executes other processes such that a process for determining whether or not a combination of the symbols 17 arranged in the respective cells 13 forms a predetermined winning arrangement. The game providing unit 28 is a logical device realized by a combination of a microprocessor and software. In addition, the generation of the random number may be realized by a physical device with which electronic circuits has been combined. Further, other logical devices or physical devices necessary to execute the slot game is appropriately provided in the control unit 20, but are not shown.

The manipulation device 6 and the display device 3 are connected to the control unit 20. The manipulation device 6 outputs a signal resulting from a manipulation of a player to the control unit 20. The display device 3 displays an image resulting from the image signal output from the control unit 20. The control unit 20 executes the game in predetermined order according to the game program 22 with referencing an output signal of the manipulation device 6. Accordingly, the control unit 20 displays the game screen 10 on the display device 3 according to a situation of the slot game. Further, accordingly, the control unit 20 functions as a game screen presenting device of the present invention.

Furthermore, as an input device or output device necessary to execute the slot game, a coin insertion device 24 and an outlet device 25 are connected to the control unit 20. The coin insertion device 24 receives coin serving as a compensation to play a game through the coin slot 5. Additionally, the coin insertion device 24 outputs a signal to the control unit 20 according to a coin insertion amount (insertion value).

The outlet device 25 executes payment of the coin as dividend of the game to the player according to an instruction from the control unit 25. The payment of the coin is executed through a coin outlet 7. In addition, a received compensation and a dividend to the player are not limited to the coin. For example, a medal, a token or the like serving as alternative currency may be used. Alternatively, an accounting method that allows a currency value or an amusement value to be exchanged through exchange of electronic currency and other electronic information may be used. In this case, an information communication device for exchange of electronic information and a storage medium for storing exchanged information may be used instead of the coin slot 8 and the coin outlet 7.

Next, the reel data 23*a*, the reel arrangement data 23*b*, and the mystery reel probability data 23*c* will be described. The reel data 23*a* is data in which a type of symbol 17 arranged in each symbol area 19 of each virtual reel 16 is described. FIG. 5 is a diagram illustrating an example of content of the reel data 23*a*. Further, the example of FIG. 5 illustrates only a portion of reel data 23*a*. As illustrated in FIG. 5, information indicating a type of reel such as "Reel A", "Reel B" and "Reel C" is included in the reel data 23*a*. The type corresponds to a type of the arrangement of the virtual reel 16. That is, the arrangement of the symbols 17 is different according to the type of reel. The information indicating a type of reel is associated with the information of the symbol 17. That is, the reel data 23*a* is a set of records in which the information indicating a type of reel and the information of the symbol 17 are described so as to be associated with each other.

Further, information described "Inner Reel" is also included in the information indicating a type of reel. This information corresponds to information indicating the inner reel 16*a* as a type of reel. That is, the "Inner Reel" indicates a record for defining a type of symbol 17 arranged in the symbol area 19 of the inner reel 16*a*.

In the example of FIG. 5, the information of the symbol 17 of letters such as "Q", "K" and "A" and the symbol 17 of a figure such as "PIC-b" are associated in "Reel A." The information "PIC-b" corresponds to, for example, information indicating a figure of an elephant. That is, the symbol area 19 is arranged so that the symbols 17 are arranged in order of "Q", "K", "A" and "elephant" in the virtual reel 16 corresponding to "Reel A."

In the example of FIG. 5, the information of the symbol 17 of letters such as "Wild" and the symbols 17 of figures such as "PIC-a", "PIC-b", "PIC-c" and "PIC-d" is associated with "Inner Reel." For example, "PIC-a", "PIC-c" and "PIC-d" correspond to information indicating figures such as a lion, a map, and a butterfly. That is, the symbol area 19 is arranged so that the symbols 17 are arranged in order of "Wild", "lion", "elephant", "map" and "butterfly" in the inner reel 16*a*.

Furthermore, information "Inner" is associated with the information of "Reel D" to "Reel G." The information "Inner" is information indicating the variable symbol area 19*a*. That is, any one of the symbols 17 associated with the "Inner Reel" is arranged in a position of the information "Inner." In all of "Reel D" to "Reel G", the information "PIC-c" is arranged before the information "Inner." That is, the symbol area 19 is arranged so that the symbol 17 of the inner reel 16*a* is arranged next to the symbol 17 of "map" in the virtual reels 16 corresponding to "Reel D" to "Reel G."

The reel arrangement data 23*b* is data for defining a type of the virtual reel 16 associated with each cell 13. FIG. 6 is a diagram illustrating an example of content of the reel arrangement data 23*b*. As illustrated in FIG. 6, information indicating the cell columns 15 such as "1st column", "2nd column" and "3rd column" is included in the reel arrangement data 23*b*. For example, the information "1st column" functions as information indicating the cell column 15 at a left end in the example of FIG. 2, and the information "2nd column" functions as information indicating the right adjacent cell column 15 (the second cell column from the left end). That is, for example, the information indicating each cell column 15 in the reel arrangement data 23*b* functions as information indicating the respective cell columns 15 in an alignment order of the game screen 10.

Further, the information indicating each cell column 15 is associated with the information indicating a type of reel in each cell 13 of each cell column 15. The information indicating a type of reel corresponds to the information indicating a type of reel in the reel data 23*a*. That is, the reel arrangement data 23*b* is a set of records in which the information indicating each cell column 15 and information indicating a type of reel of each cell 13 are described so as to be associated with each other.

In the example of FIG. 6, information of three "Reel A" is associated with the information "1st column." The information of three "Reel A" corresponds to the cells 13 in the cell column 15 indicated by the information "1st column" in order. That is, in the example of FIG. 2, the three cells 13 in the cell column 15 at the left end corresponding to the "1st column" are all associated with the virtual reel 16 of "Reel A." Similarly, the three cells 13 in the second cell column 15 from the left corresponding to the "2nd column" are all associated with "Reel B", the three cells 13 in the right adjacent cell column 15 are all associated with "Reel C", and the three cells 13 in the further right adjacent cell column 15 are all associated with "Reel D." That is, when the example of FIG. 6 is applied to the example in FIG. 2, the same type of virtual reel 16 is used in each cell 13 of the cell column 15 in all cell columns from the cell column 15 at the left end to the second cell column 15 from the right end.

Meanwhile, in the example of FIG. 2, the three cells 13 in the cell column 15 at the right end corresponding to the "5th column" are associated with "Reel E", "Reel F", and "Reel G." More specifically, the three cells 13 in the cell column 15 at the right end are associated with the virtual reels 16 of "Reel E", "Reel F", and "Reel G" in order from a top. That is, the three cells 13 in the cell column 15 at the right end are associated with different types of virtual reels 16 from each other. Further, the types are different from the types of virtual reels 16 used in the other cell column 15. For example, a correspondence relationship of the cells 13 and the virtual reels 16 is defined by the reel arrangement data 23*b*, as described above.

The mystery reel probability data 23*c* is data for defining probability that the mystery reel will be arranged. FIG. 7 is a diagram illustrating an example of content of the mystery reel probability data 23*c*. The example of FIG. 7 illustrates only a portion of an example of the mystery reel probability data 23*c*. As illustrated in FIG. 7, information indicating positions of mystery reels such as "(00000)" and "(In0000)" is included in the mystery reel probability data 23*c*. Further, the information indicating a position of each mystery reel is associated with information indicating probability such as "9500" and "10". That is, the mystery reel probability data 23*c* is a set of records in which such information is described so as to be associated with each other.

In the example of FIG. 7, for example, "(In0000)" illustrates a case in which the mystery reel is arranged in the cell column 15 at the left end. That is, the information "In" indicates the position of the mystery reel and the information "0" indicates a position of the normal virtual reel 16.

Accordingly, "(0In000)" indicates a case that the mystery reel is arranged in the second from the left end, and "(0000In)" indicates a case that the mystery reel is arranged at the right end. Further, the mystery reel probability data 23*c* includes, as the information indicating the position of the mystery reel, information when a plurality of mystery reels are arranged, such as "(InIn000)."

Meanwhile, for example, "9500" indicates probability that the mystery reel will appear 9500 times of 10000 times. That is, probability that "(00000)" will be generated is 95.00%. Similarly, "10" indicates probability that the mystery reel will appear 10 times of the 10000 times, and "20" is probability that the mystery reel will appear 20 times of 10000 times. That is, probability that "(In0000)" will be generated is 0.1%, and probability that "(000In0)" will be generated is 0.2%. For example, the mystery reel probability data 23*c* defines the probability that the mystery reel will be arranged in each cell column 15, as described above.

Further, when the mystery reel is arranged, for example, reel arrangement data 23*bs* for a mystery reel arrangement is used. FIG. 8 is a diagram illustrating an example of reel arrangement data 23*bs* for a mystery reel arrangement. The example of FIG. 8 illustrates a case in which the mystery reel is arranged at the left end of the game screen 10. That is, the example of FIG. 8 illustrates a case in which the position of the mystery reel corresponding to "(In0000)" in the example of FIG. 7 is drawn. In this case, as illustrated in FIG. 8, in the reel arrangement data 23*bs* for a mystery reel arrangement, the information "Inner" as the information indicating a type of reel is associated with the information "1st column" indicating the cell column 15 at the left end. That is, it can be seen from a comparison with FIG. 6 that information of a type of reel associated with the information "1st column" is changed from "Reel A" to "Inner". The information "Inner" functions as the information indicating the inner reel 16*a* as a type of reel. Thus, in order to arrange the mystery reel according to the drawing result, the reel arrangement data 23*bs* for a mystery reel is temporarily generated. In addition, when the slot game using the mystery reel ends, the reel arrangement data 23*bs* for a mystery reel is discarded and original reel arrangement data 23*b* is used.

Figure 9A:
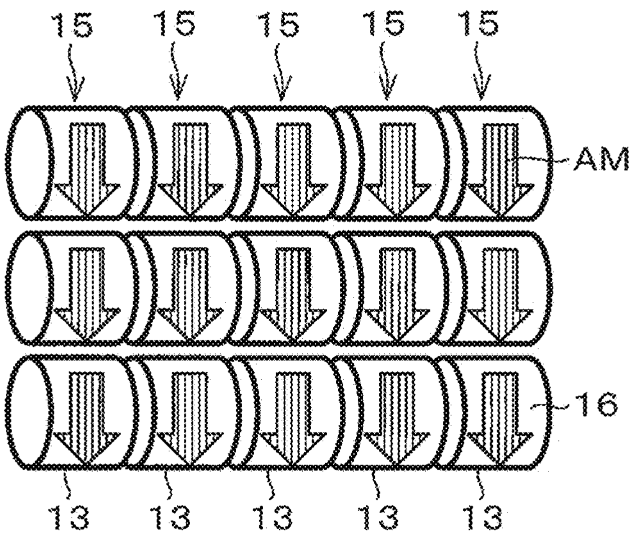
FIG. 9A is a diagram illustrating an example of a game screen when each virtual reel is scrolled.
Figure 9B:
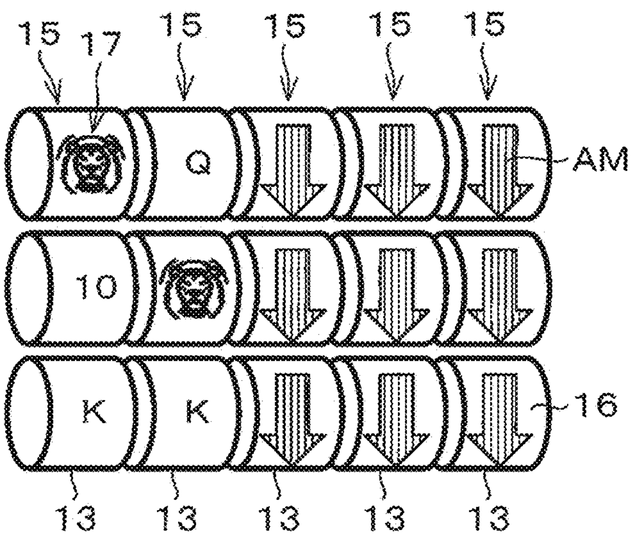
FIG. 9B is a diagram illustrating an example of a game screen when some virtual reels stop.
Figure 9C:
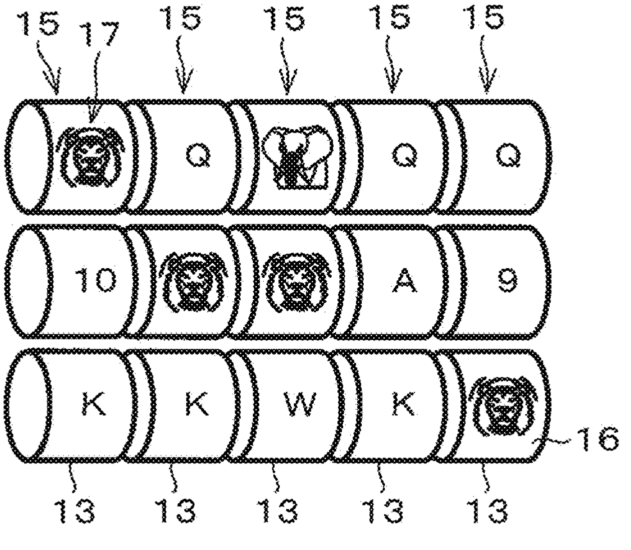
FIG. 9C is a diagram illustrating an example of a game screen when all virtual reels stop.

Next, the particular rendition of the inner reel 16*a* will be described. First, normal rendition will be described with reference to FIGS. 9A to 9C. As described above, in the game screen 10, the virtual reel 16 of the each cell 13 is scrolled and stops in a predetermined stop time when the game starts. FIGS. 9A to 9C are diagrams illustrating an example of the scrolling and stopping of each virtual reel 16 in normal rendition. Specifically, FIG. 9A is a diagram illustrating an example of the game screen 10 when each virtual reel 16 is scrolled. In FIG. 9A, a downward arrow AM indicates a scroll direction from a top to a bottom. As illustrated in FIG. 9A, each virtual reel 16 is scrolled in a direction indicated by the arrow AM in each cell 13. That is, each virtual reel 16 is scrolled downward (in a vertical alignment direction of each cell 13) in each cell 13.

FIG. 9B is a diagram illustrating an example of the game screen 10 when some of the virtual reels 16 stop. More specifically, FIG. 9B illustrates a case at which a predetermined stop time of some of the virtual reels 16 has arrived from a state of FIG. 9A (after a predetermined time has elapsed from the state of FIG. 9A). As illustrated in FIG. 9B, the scroll of each virtual reel 16 stops, for example, in units of cell column 15. That is, for example, the same time is used as the predetermined stop time in units of cell column 15. In the example of FIG. 9, the cell column 15 at the left end and the right adjacent cell column 15 stop, and the three other cell columns 15 are still scrolled. In addition, the scroll of each virtual reel 16 may stop in units of cell 13. That is, the predetermined stop time may differ for each virtual reel 16.

FIG. 9C is a diagram illustrating an example of the game screen 10 when all the virtual reels 16 stop. More specifically, FIG. 9C illustrates a case at which a predetermined stop time of all virtual reels 16 has arrived from the state of FIG. 9A (after a predetermined time has further elapsed from the state of FIG. 9B). As illustrated in FIG. 9C, the symbol 17 is arranged in each cell 13 in association with the stop of each virtual reel 16. Further, when a combination of the symbols 17 arranged in the respective cells 13 forms a predetermined winning arrangement in a state when the scroll of each virtual reel 16 stops, a special privilege is granted. Further, for example, an arrangement in which the same symbols 17 are arranged in the five cells 13 forming a row in a horizontal direction may be adopted as a predetermined winning arrangement. Thus, an arrangement in which the same symbols 17 are located on a predetermined line so that the other symbol 17 is not interposed therebetween is adopted as an example of the predetermined winning arrangement. Further, a plurality of predetermined winning arrangements may be prepared. Additionally, as the number of formed predetermined winning arrangements increases, price of the special privilege may increase.

Meanwhile, as described above, the common inner reel 16*a* is used in the variable symbol areas 19*a* of the respective virtual reels 16 and the arranged symbols 17 are common. That is, when the variable symbol areas 19*a* of the respective virtual reels 16 are arranged in the respective cells 13, the symbols 17 of their cells 13 match. Furthermore, when the mystery reel is arranged, the symbols 17 of the cell column 15 in which the mystery reel is arranged and the cell 13 in which the variable symbol area 19*a* is arranged all match. Accordingly, when the mystery reel is arranged, probability that the predetermined winning arrangement will be formed increases. In the case like this, the particular rendition is executed in order to improve anticipation sense of a player of the slot game.

Figure 10A:
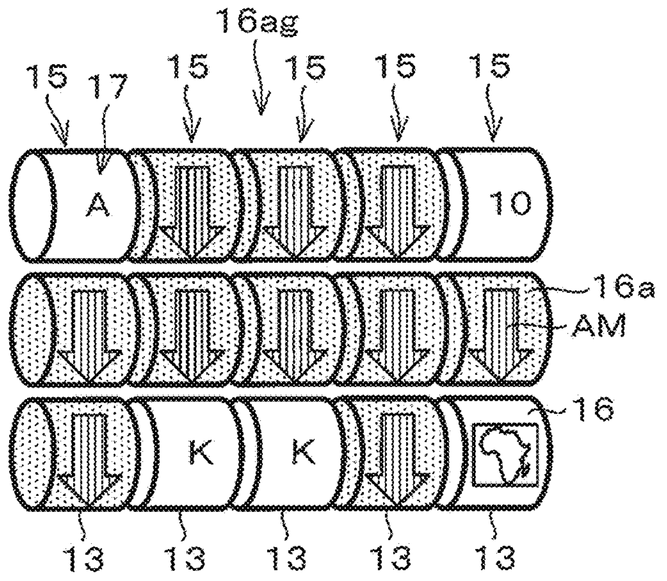
FIG. 10A is a diagram illustrating an example of particular rendition.
Figure 10B:
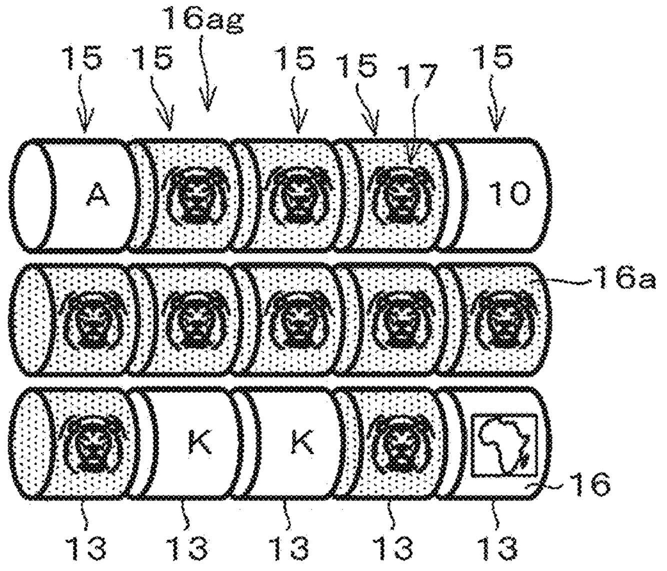
FIG. 10B is a diagram illustrating an example of a game screen after a predetermined time has elapsed from a state of FIG. 10A.

FIG. 10A is a diagram illustrating an example of the particular rendition. In FIG. 10A, cells 13 having a dot pattern (matches cells 13 in which a downward arrow AM is arranged) indicate cells 13 in which the inner reels 16*a* (including the mystery reels. The same applies to the following description, unless mentioned otherwise) are being scrolled. As illustrated in FIG. 10A, in an example of the particular rendition, the inner reels 16*a* used in the respective cells 13 are scrolled while being synchronized with one another. That is, the inner reels 16*a* of the cells 13 move similarly as one inner reel group 16*ag*. Meanwhile, the scroll of the other virtual reel 16 does not necessarily match the scroll of each inner reel 16*a*. In the example of FIG. 10A, ten inner reels 16*a* are scrolled while being synchronized, while five virtual reels 16 such as "A" and "K" already stop. FIG. 10B is a diagram illustrating an example of the game screen 10 after a predetermined time has elapsed from a state of FIG. 10A. As illustrated in FIG. 10A, the inner reel group 16*ag* stops at the same time and arranges the same symbols 17 in the cells 13. Further, the inner reel group 16*ag* functions as a symbol line group of the present invention.

Figure 10C:
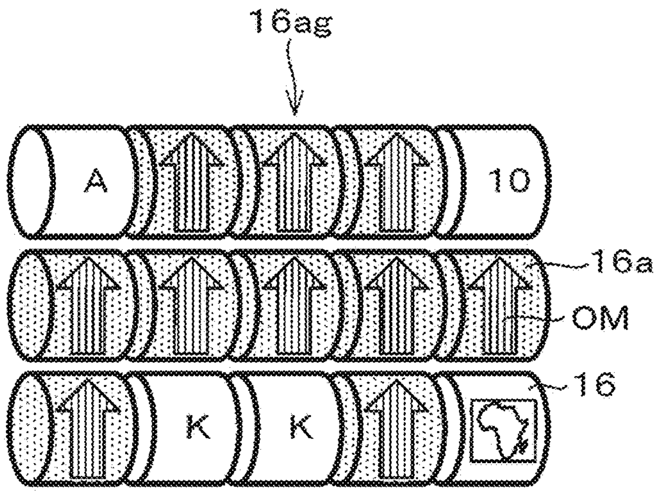
FIG. 10C is a diagram illustrating another example of the particular rendition.

FIG. 10C is a diagram illustrating another example of the particular rendition. As illustrated in FIG. 10C, an inner reel group 16*ag* is scrolled in a direction indicated by an upward arrow OM from a bottom to a top, that is, in a direction opposite to the scroll direction in the case of FIG. 10A. Further, this scroll direction is opposite to the scroll direction of the other virtual reel 16. That is, in another example of the particular rendition, the inner reel group 16*ag* is scrolled in a direction opposite to the normal scroll direction.

Further, various particular renditions are executed in addition to above described examples. For example, in another example of the particular rendition, slow spin or long spin of the inner reel group 16*ag* is applied. The slow spin refers to a scroll having a scroll speed lower than a normal scroll speed. On the other hand, the long spin refers to a scroll having scroll time longer than a normal scroll time. Further, the scroll direction when the slow spin or the long spin is executed may be a normal direction (a direction indicated by the downward arrow AM) or may be the other direction (a direction indicated by the upward arrow OM).

Figure 11A:
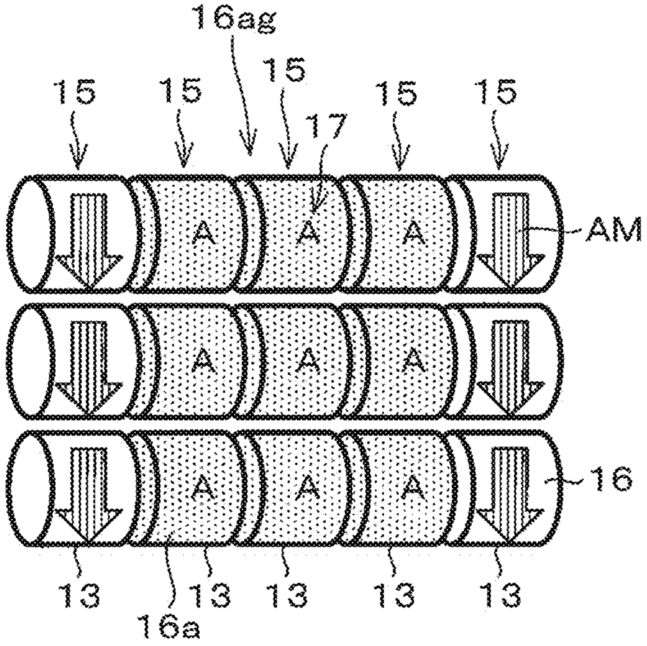
FIG. 11A is an illustrative diagram illustrating previous stop spin.
Figure 11B:
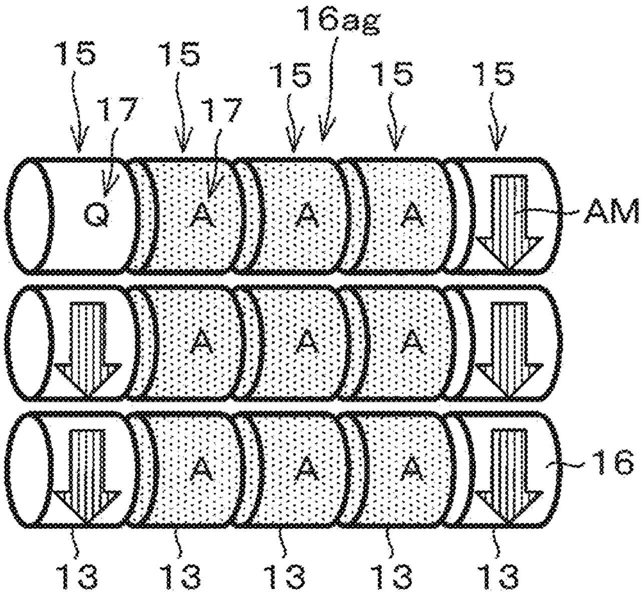
FIG. 11B is a diagram illustrating an example of a game screen after a predetermined time has elapsed from a state of FIG. 11A.

Furthermore, in another example of the particular rendition, for example, a previous stop spin may be adopted. FIG. 11A is an illustrative diagram illustrating a previous stop spin. As illustrated in FIG. 11A, in the rendition of the previous stop spin, the inner reel group 16*ag* stops earlier than the other virtual reels 16. That is, the previous stop spin refers to a rendition in which the inner reel group 16*ag* stops earlier than the other virtual reels 16. Meanwhile, FIG. 11B is a diagram illustrating the game screen 10 after a predetermined time has elapsed from the state of FIG. 11A. As illustrated in FIG. 11B, in the rendition of the previous stop spin, the inner reel group 16*ag* first stops and then the other virtual reels 16 stop in order, opposite to the example of FIG. 10A or the like. That is, in the rendition of the previous stop spin, the first stopped inner reel group 16*ag* waits for the other virtual reel 16*s* to stop. In this case, the respective virtual reels 16 may stop in a different time. In addition, in the particular rendition, various other renditions may be adopted.

Figure 12:
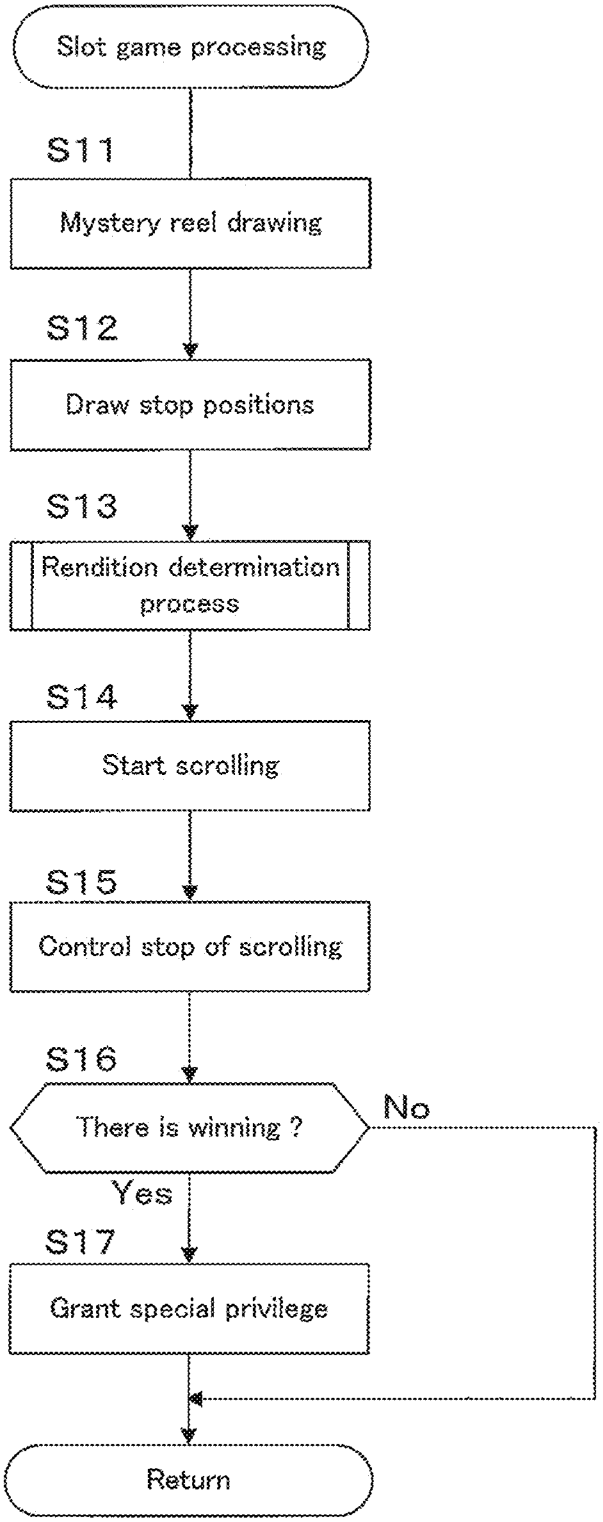
FIG. 12 is a diagram illustrating an example of a flowchart of a slot game processing routine.

Next, a slot game process and a rendition determination process executed by the control unit 20 will be described with reference to FIGS. 12 and 13. FIG. 12 is a diagram illustrating an example of a flowchart of a slot game processing routine. The control unit 20 executes the routine of FIG. 12 through the game providing unit 28. Further, the game providing unit 28 executes the routine of FIG. 12 each time when a predetermined game start condition is satisfied. For example, a condition satisfied when a predetermined compensation is consumed or when a predetermined start manipulation is performed after it may be adopted as a predetermined game start condition. That is, for example, the routine of FIG. 12 is executed when the predetermined compensation is consumed and when the predetermined start manipulation is performed. In addition, the control unit 20 executes various known processes necessary to execute the slot game, in addition to the slot game process and the rendition determination process, but a detailed description of such processes will be omitted.

If the routine of FIG. 12 starts, the game providing unit 28 first executes a mystery reel drawing to determine an arrangement position of the mystery reel in step S11. This drawing is, for example, executed using a random number. Further, the drawing is executed based on the mystery reel probability data 23*c*. That is, the drawing is executed using the random number so that the position of the mystery reel is realized with probability defined as the mystery reel probability data 23*c*. In addition, probability that the mystery reel will not appear is also defined in the mystery reel probability data 23*c*. Accordingly, a result indicating that the mystery reel is not arranged is included in the drawing result in step S11.

In next step S12, the game providing unit 28 draws stop positions of the virtual reels 16 and the inner reels 16*a*. This drawing is executed using a random number for each virtual reel 16 and each inner reel 16*a*. That is, the symbol 17 to be arranged in each cell 13 is determined using the drawing.

In next step S13, the game providing unit 28 executes a rendition determination process routine as a subroutine for determining a scroll rendition such as a normal rendition and a particular rendition. In the rendition determination process routine, there is determined the type of rendition such as a normal rendition, a particular rendition in which scroll is performed in a normal direction, or a particular rendition in which scroll is performed in a reverse direction. Content of the rendition determination process routine will be described below.

In next step S14, the game providing unit 28 starts scrolling of the virtual reels 16 and the inner reels 16*a*. The scroll rendition determined in step S13 is reflected on this scroll. That is, the scroll is executed, for example, so that a particular rendition scrolled in a reverse direction is realized based on the determination in the process of step S13. Further, the mystery reel is used for the scroll in the cell 13 in which the mystery reel is arranged in step S11 instead of the virtual reel 16.

In addition, the virtual reel 16 and the inner reel 16*a* are scrolled at the same speed and in the same direction while the virtual reel 16 is being scrolled. Accordingly, the inner reel 16*a* is represented so as to relatively stop with respect to the virtual reel 16 during scrolling of the virtual reel 16. That is, the inner reel 16*a* is scrolled so that its existence is not recognized by the player during scrolling of the virtual reel 16. Additionally, when the virtual reel 16 stops so that the variable symbol area 19*a* is arranged in the cell 13, the inner reel 16*a* begins to be scrolled in synchronization with the stop. Further, since these are substantially simultaneously executed, it is difficult for the stop of the virtual reel 16 to be visually recognized by the player. That is, representation is performed so as to be naturally shifted from scrolling of the virtual reel 16 to the scroll of the inner reel 16*a*. Accordingly, there can be generated a state that the inner reels 16*a* are continuously scrolled only in the some cells 13 in which the variable symbol area 19*a* is arranged while the virtual reels 16 of the other cells 13 stop.

In next step S15, the game providing unit 28 stops the virtual reels 16 and the inner reels 16*a* in the stop position determined in step S12. In next step S16, the game providing unit 28 determines whether or not there is winning. Specifically, the game providing unit 28 determines whether the symbols 17 arranged in the respective cells 13 form a predetermined winning arrangement. Additionally, if the predetermined winning arrangement is formed, the game providing unit 28 determines that there is winning and if the predetermined winning arrangement is not formed, the game providing unit 28 determines that there is no winning. Further, when there are multiple types of predetermined winning arrangements, a determination as to whether there is winning is performed for each type of winning arrangement. Additionally, if any one winning arrangement is formed, it is determined that there is winning. When the determination result in step S16 is a negative result, that is, if the predetermined winning arrangement is not formed, the game providing unit 28 skips a subsequent process and ends the current routine.

Meanwhile, if the determination result in step S16 is a positive result, that is, if the predetermined winning arrangement is formed, the game providing unit 28 proceeds to step S17. In step S17, the game providing unit 28 grants a special privilege according to the formed winning arrangement based on the determination result in step S16. The special privilege is granted according to a plurality of winning arrangements when the winning arrangements are formed. When the process of step S17 ends, the game providing unit 28 ends the current routine. Accordingly, the slot game involving the rendition such as the normal rendition and the particular rendition is realized.

Figure 13:
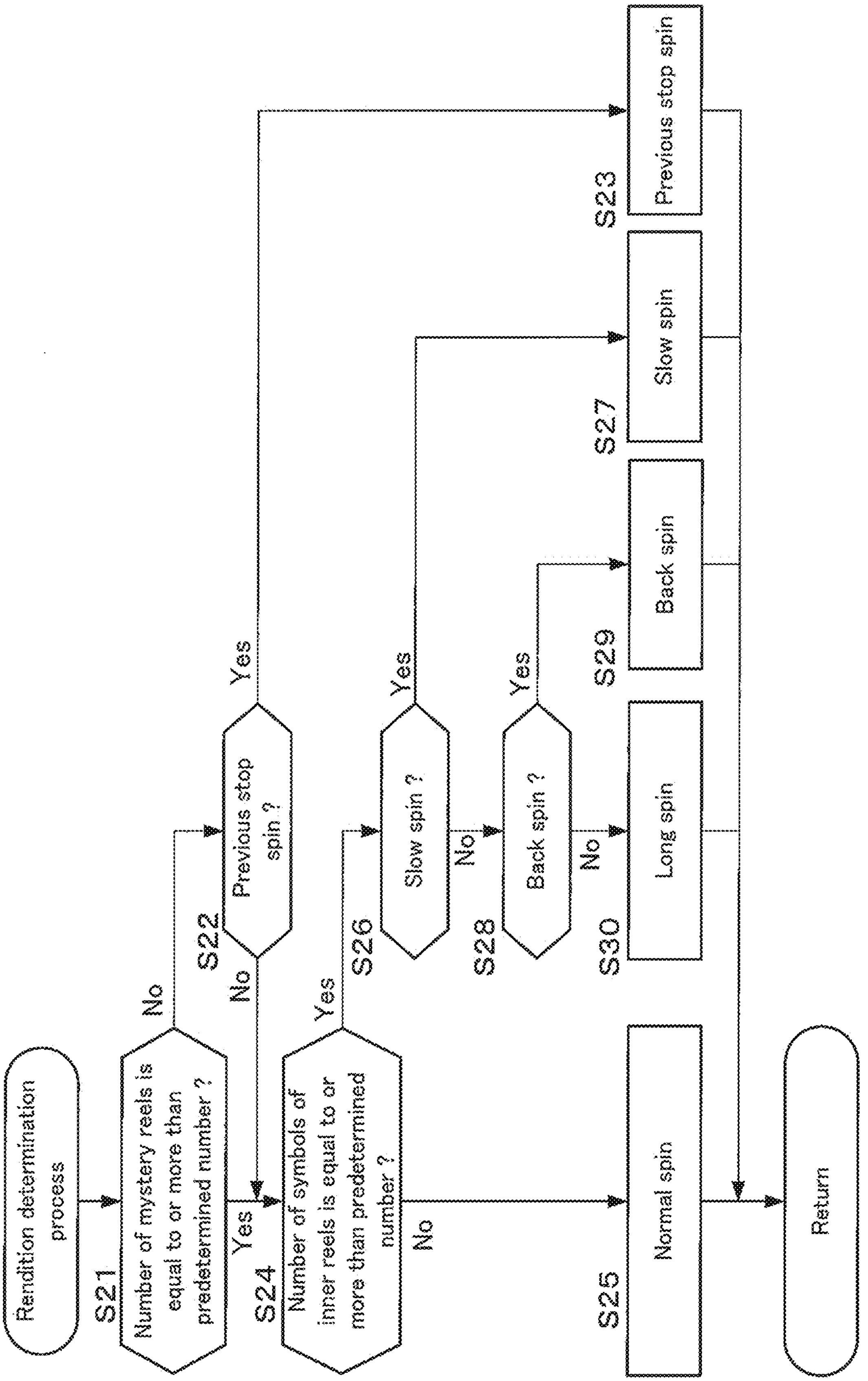
FIG. 13 is a diagram illustrating an example of a flowchart of a rendition determination process routine.

Meanwhile, FIG. 13 is a diagram illustrating an example of a flowchart of a rendition determination process routine. The routine of FIG. 13 is called and executed in step S13 of the routine of FIG. 12 as a subroutine of the slot game processing routine.

When the game providing unit 28 starts the routine of FIG. 13, the game providing unit 28 first determines, in step S21, whether the number of mystery reels is equal to or more than a predetermined number. This determination is executed based on the drawing result in step S11 of the routine of FIG. 12. Further, for example, a number 2 is used as the predetermined number. If this determination result is a negative result, that is, if the number of mystery reels is equal to or less than 1, the game providing unit 28 proceeds to step S22. In step S22, the game providing unit 28 determines whether the previous stop spin is to be executed. This determination is executed based on the drawing. Specifically, drawing by which positive result and the negative result can be generated with the same probability is executed. Additionally, when this determination result is the positive result, that is, when the previous stop spin is to be executed, the game providing unit 28 proceeds to step S23. In step S23, the game providing unit 28 determines that the rendition to be executed in step S14 of the routine of FIG. 12 is the previous stop spin, and ends the current routine.

On the other hand, if the determination result in step S21 is a positive result or if the determination result in step S22 is a negative result, the game providing unit 28 proceeds to step S24. More specifically, when the number of mystery reels is 2 or more or when the previous stop spin is not to be executed, the game providing unit 28 proceeds to step S24. In step S24, the game providing unit 28 determines whether the number of the symbols 17 of the inner reels 16*a* arranged in the respective cells 13 is equal to or more than a predetermined number based on the drawing result in step S12 of the routine of FIG. 12. For example, a number 5 is adopted as the predetermined number. That is, the game providing unit 28, in step S24, determines whether the number of the symbols 17 of the inner reels 16*a* arranged in the respective cells 13 is 5 or more. If this determination result is a negative result, that is, the number of the symbols 17 of the inner reels 16*a* are 4 or less, the game providing unit 28 proceeds to step S25. In step S25, the game providing unit 28 determines that the rendition to be executed in step S14 of FIG. 12 is a normal spin, i.e., a normal rendition, and ends the current routine.

On the other hand, if the determination result in step S24 is a positive result, that is, if the number of the symbols 17 of the inner reel 16*a* is 5 or more, the game providing unit 28 proceeds to step S26. In step S26, the game providing unit 28 determines whether the slow spin is to be executed. This determination is executed based on the drawing. Specifically, drawing by which the positive result and the negative result can be generated with the same probability is executed. Additionally, if the determination result is a positive result, that is, when the slow spin is to be executed, the game providing unit 28 proceeds to step S27. In step S27, the game providing unit 28 determines that the rendition to be executed in step S14 of the routine of FIG. 12 is a slow spin, and ends the current routine. In addition, here, the slow spin is executed with the scroll direction being a normal direction.

On the other hand, if the determination result in step S26 is a negative result, that is, when the slow spin is not to be executed, the game providing unit 28 proceeds to step S28. In step S28, the game providing unit 28 determines whether the back spin is to be executed. This determination is executed based on the drawing. Specifically, drawing by which the positive result and the negative result can be generated with the same probability is executed. Additionally, when the determination result is a positive result, the game providing unit 28 proceeds to step S29. In step S29, the game providing unit 28 determines that the rendition to be executed in step S14 of the routine of FIG. 12 is a back spin (a spin having an opposite scroll direction), and ends the current routine.

Meanwhile, the determination result in step S28 is a negative result, that is, when the back spin is not to be executed, the game providing unit 28 proceeds to step S30. In step S30, the game providing unit 28 determines that the rendition to be executed in step S14 of the routine of FIG. 12 is the long spin, and ends the current routine. In addition, here, the long spin is executed with the scroll direction being a normal direction.

In step S14 of the routine of FIG. 12, the game providing unit 28 reflects each rendition determined by the routine of FIG. 13 on the scroll. Accordingly, when the number of symbols 17 of the inner reels 16*a* arranged in the respective cells 13 is greater than more than a predetermined number, a particular rendition is executed.

As described above, according to the game machine of this embodiment, the virtual reel 16 is arranged in each cell 13. Therefore, it is possible to control the symbols 17 to be arranged in each cell 13 for each cell 13. Accordingly, since variations of a combination of the symbols 17 appearing in the respective cells 13 can be increased, interest of the game can be improved.

Further, the variable symbol area 19*a* is included in a portion of each virtual reel 16. Additionally, the symbol 17 is arranged in the variable symbol area 19*a* through the scroll of the inner reel 16*a*. Further, the same inner reels 16*a* are used in the variable symbol areas 19*a* of the respective virtual reels 16 and their movements are synchronized. That is, the respective inner reels 16*a* all begin to be simultaneously scrolled from the same stop positions, are continuously scrolled at the same speed, and stop so that the same symbols 17 are arranged in the respective variable symbol areas 19*a*. Accordingly, when the variable symbol areas 19*a* are determined as the stop positions of the cells 13, the same symbols 17 are arranged in the cells 13 and the winning possibility is improved. That is, the winning probability can be increased using the inner reels 16*a* whose movements are synchronized. Furthermore, the mystery reel may be used in each cell 13. The movement of the mystery reel is synchronized to the movement of the inner reel 16*a*. Specifically, the mystery reel is scrolled from the same stop position at the same speed as the inner reel 16*a* and stops so as to arrange the same symbol 17 as the symbol 17 arranged in the variable symbol area 19*a* by the inner reel 16*a*. That is, the same symbol 17 as the symbol 17 arranged in the cell 13 by the inner reel 16*a* is arranged in the cell 13 in which the mystery reel is used. Accordingly, when the mystery reel is used, the winning probability can be further increased. Accordingly, expectation of the player can be improved.

Additionally, when the symbols 17 of the mystery reel and the inner reel 16*a* are arranged in the cells 13, the movements of the mystery reel and the inner reel 16*a* are controlled so that the symbols 17 are synchronized and moved. That is, the mystery reel and the inner reel 16*a* are treated as one reel column group and the movement is controlled in units of reel group. Accordingly, since stimulation of a change in the symbol 17 can be given to the player while maintaining a state in which the winning probability increases, loss of interest in the game can be avoided.

In the above-described embodiment, the control unit 20 functions as a symbol determination device, a symbol line control device, a symbol line group control device, a particular symbol line control device, and another symbol line control device of the present invention by executing the routine of FIG. 12 through the game providing unit 28. Further, the control unit 20 functions as a symbol number determination device of the present invention by executing the routine of FIG. 13 through the game providing unit 28.

The present invention is not limited to the above-described embodiment and may be embodied as an appropriate embodiment. In the above-described embodiment, the symbol 17 of the inner reel 16*a* is used as a specific symbol. However, the specific symbol is not limited to such an embodiment. For example, the same symbols 17 of the respective virtual reels 16 may be used as the specific symbols. Further, the specific symbol is not limited to the same symbol 17. Various symbols related to formation of the winning arrangement may be adopted as the specific symbol.

In the above-described embodiment, an arrangement of the mystery reel is determined by the drawing. That is, the drawing result is adopted as a predetermined change condition for performing a change from use of the virtual reel 16 to use of the mystery reel. However, the predetermined change condition is not limited to such an embodiment. For example, various conditions, such as a case that a specific winning arrangement is formed and a case that a predetermined compensation is consumed over a predetermined value, may be adopted as the predetermined change condition.

In the above-described embodiment, the virtual reel 16 is arranged for each cell 13, and the movement of the virtual reel 16 is controlled for each cell 13. However, the present invention is not limited to such an embodiment. For example, the virtual reel 16 may be arranged so that the symbol 17 appears in each of the cells 13 that form the cell column 15. That is, the virtual reel 16 is arranged for each cell column 15 and the movement of the virtual reel 16 may be controlled in units of cell column 15.

Further, in the above-described embodiment, the slot game is provided through the game screen 10. However, the slot game is not limited to such an embodiment. For example, a mechanical reel may be used instead of the virtual reel 16, actually. Further, in this case, a dual reel having a dual structure may be adopted as the mechanical reel. In this case, the display device 3 may be omitted. The dual reel may be realized by a combination of the virtual reel and the mechanical reel. This combination may be realized, for example, by a combined image using a transmission liquid crystal or a half mirror. Specifically, for example, when a mechanical reel is adopted as the inner reel, a transmission liquid crystal may be provided so that the variable symbol area of the virtual reel as an outer reel can transmit a symbol of the inside mechanical reel. Further, a mechanical reel with a display device (a small monitor such as a liquid crystal monitor) in a portion may be used as the mechanical reel. That is, the display device of the mechanical reel may function as the variable symbol area. Alternatively, the dual reel may be realized using a half mirror which overlaps and displays two reels (may be mechanical reels or may be virtual reels) in the same position. That is, the variable symbol area may be realized using the half mirror by switching a display from a display of a symbol of one reel to a display of the other symbol. For example, when the reels are virtual reels, the switching of the display may be realized by displaying and non-displaying of the other reel.

Alternative Embodiment of the Invention

In another aspect of the present invention, the control unit 10 controls the manner in which the virtual reels 16, 16*a* spin and/or stop based, or a function of the symbol which has been determined will appear on the respective reel in the outcome of a game. In this aspect, the virtual reel may refer to a virtual reel 16, an inner reel 16*a*, a mystery reel, or a combination thereof. In general, the control unit 10 independently determines which symbol 17 will appear in each cell 13 of the matrix. The independently determined symbols comprise the outcome for the game. After the symbols appearing in the outcome of the game are independent determined, the reels 16, 16*a* are spun and stopped in a manner dependent upon the symbols 17 in the outcome. For example, in one embodiment, all reels, for which the determined symbol, are related are spun and/or stopped in a similar manner. In one embodiment, two symbols 17 are related if the symbols are the same symbol. In another embodiment, two symbols are related if the symbols share an attribute, e.g., color and/or shape and/or type. In yet another embodiment, a plurals of symbols are related if the symbols form a winning combination in the cell matrix.

In one embodiment, the reels 16, 16A having the related symbol in the outcome form a first plurality of reels. The control unit 10 spins and/or stops the first plurality of in a first manner. The control unit 10 spins and/or stops a second plurality of reels 16, 16*a* in a second manner. The second plurality of reels 16, 16*a* may include the remaining reels, i.e., all of the reels 16, 16*a* except the first plurality of reels, or a subset of the remaining reels. In general, the first manner is different from the second manner. It should be noted that the reels are spun and stopped in the first or second manner prior to the outcome being displayed. In other words, the related symbols being displayed in the outcome of a game are not a trigger which specifies the manner in which the reels are spun for the next spin. Rather, the related symbols which will appear in the outcome of a game specify the manner in which the reels are spun and/or stopped for the current spin/game. In this manner, anticipation and excitement is built within the player for the current game/spin.

In one embodiment of the present invention, the control unit 10 spins and/or stops the first plurality of the virtual reels in the first manner, if the number of the virtual reels determined to indicate related symbols is more than predetermined threshold.

In another aspect of the present invention, a plurality of spinning and stopping manners are predetermined and stored. The control unit 10 selects the first manner from the plurality of predetermined reel spinning and stopping manners. In one embodiment, the control unit 10 randomly selects the first manner from the plurality of predetermined reel and spinning and stopping manners. In another embodiment, the control unit 10 selects the first manner from the plurality of predetermined reel spinning and stopping manners based on a predetermined algorithm. For example, the control unit 10 may cycle through each of the predetermined reel spinning and stopping manners.

The manner of spinning and stopping the virtual reels 16, 16*a* may be related to the (simulated) spinning of the virtual reels and/or the symbols within the respective first or second plurality of virtual reels. In general, the virtual reels 16, 16*a* may have an associated normal manner of spinning and/or stopping. In the normal manner of spinning and/or stopping, the virtual reels 16, 16*a* spin in predetermined direction with predetermined rotation speed and stop sequentially from upper cell to lower cell of leftmost column of the cell matrix. The normal manner of spinning and/or stopping may be used when there are no related symbols in the outcome and/or for the second plurality of virtual reels, i.e., the second manner. When related symbols are detected in the outcome, the associated virtual reels 16, 16*a* are spun and/or stopped using a modified manner.

For example, the manner of spinning may include a modified period spinning manner. The period spinning manner determines when a reel stops spinning. In one embodiment, the modified spinning manner requires that the first plurality of virtual reels 16, 16*a* stops spinning before or after the other virtual reels, i.e., the second plurality of virtual reels. Each of the second plurality of reels may stop at the time and/or may stop sequentially (see above). The first plurality of reels stops spinning before or after the second plurality of virtual reels stop spinning.

For example, the manner of spinning may include a modified spinning manner. The spinning manner may include a speed of rotation of the reels 16, 16*a*. In one embodiment, the virtual reels 16, 16*a* may rotate at a normal speed. The first manner may be either a slow or fast scroll speed which is slower or faster than the normal speed, respectively.

For example, the manner of spinning may include a modified direction spinning manner. The direction spinning manner dictates in which direction, for example, up or down, a virtual reel 16, 16*a* will spin. In one embodiment, the virtual reels 16, 16*a* may rotate in a normal direction, e.g., up. The first manner may include a scroll direction which is opposite to the normal direction, e.g., down.

Other manners may also be used. For instance, for each virtual reel whose output includes the related symbol, other effects which are aimed at drawing the user or player's attention to those cells may be used. For instance, all of part of the symbols, or the associated cell, in the virtual reel whose outcome includes the related symbol may be highlighted or colored or otherwise emphasized.

In one embodiment, at least one of the virtual reels 16, 16*a* includes a variable symbol. As discussed above, the variable symbol changes into one of the symbols before indicating the determined symbol. In one embodiment, the variable symbol is changed using the inner reel 16*a*. In one embodiment, the related symbol is the variable symbol. In another embodiment, at least two of the virtual reels include a variable symbol, the variable symbols change into one of the symbols. If a plurality of variable symbols is determined to appear in the outcome of the game, the virtual reels 16, 16*a* determined to indicate the variable symbol spin and/or stop in the same manner.

Figure 14:
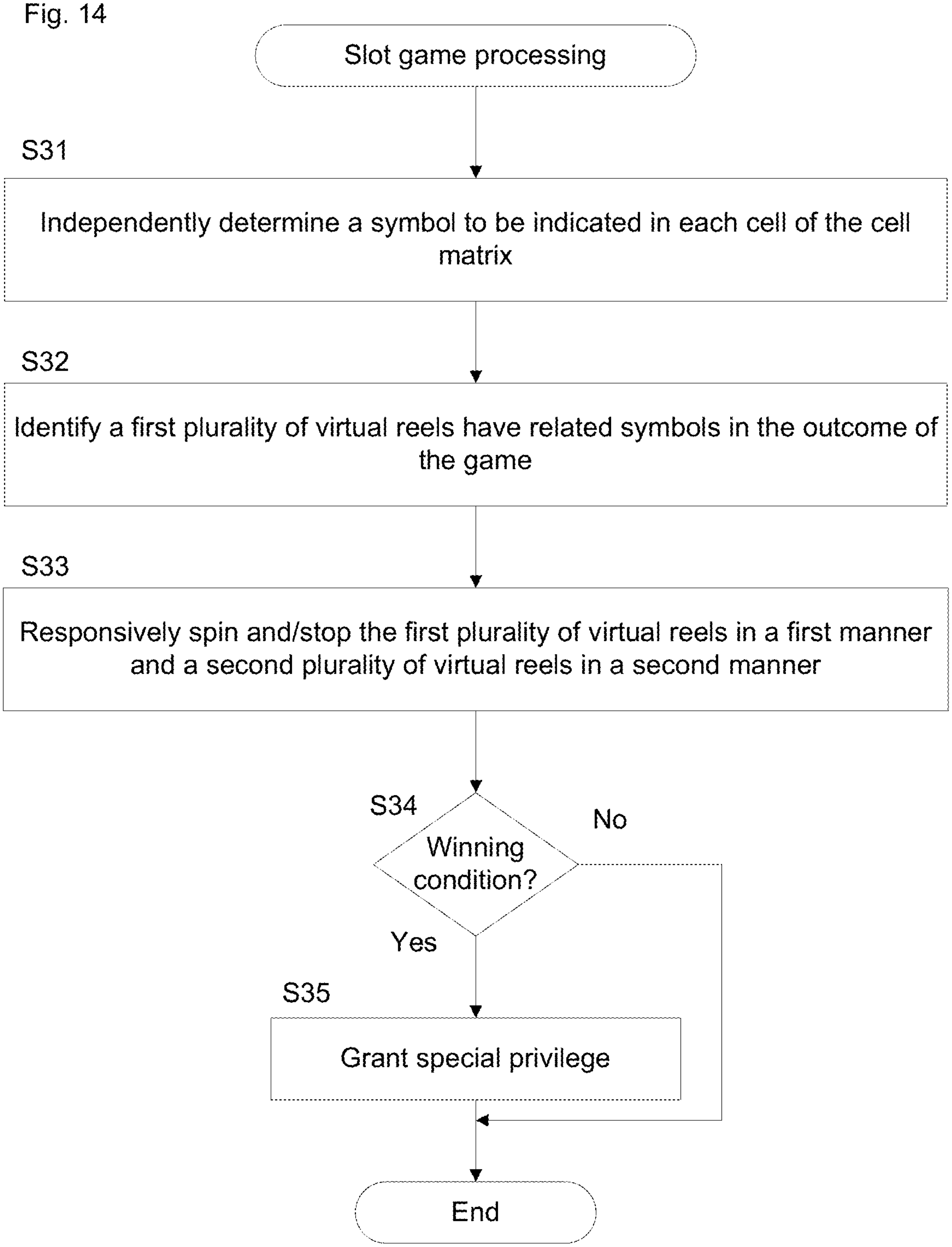
FIG. 14 is a diagram illustrating an example of a flowchart of a slot game processing routine, according to another aspect of the present invention.

With particular reference to FIG. 14, a slot game process according to an embodiment of the present invention will now be described. In step S31, a symbol 13 to be indicated in each cell of the cell matrix is independently determined. The symbols 13 comprise the outcome of the game. In a second step S32, a first plurality of virtual reels which have a related symbol (see above) which will appear in the outcome of the game are identified. In a third step S32, the first plurality of virtual reels 16, 16*a* are responsively spun and/or stopped in a first manner and a second plurality of virtual reels are spun and/or stopped in a second manner, to indicate the determined symbols in the cell matrix. In a first decision block S35, the control unit 10 determines if the outcome contains a winning condition (see above). If the outcome includes the winning condition, a special providing according to the formed winning condition is granted (see above).

In another aspect of the present invention, a non-transitory computer usable medium has a computer readable program embodied therein. The program causes a computer, e.g., the game machine 1 or a general purpose computer, or other device, to function as a display device, a user input device and a control unit. The display device is configured to display a cell matrix including a plurality of cells. Each cell indicates a portion of a virtual reel respectively adopted to the cell. The virtual reel deploys a virtual reel strip having a plurality of aligned symbols alignment. The user input device is configured to generate a signal indicative of player input. The control unit is configured to accept the signal from the user input device and initiate a game and to independently determine a symbol to be indicated in each cell of the cell matrix as an outcome of the game and identify a first plurality of virtual reels having related symbols in the outcome of the game. The control unit further responsively spins and/or stops the first plurality of the virtual reels in a first manner and spins and/or stops a second plurality of the virtual reels in a second manner to indicate the determined symbols in the cell matrix.

Other aspect and features of the present invention can be obtained from a study of the drawings and the disclosure. For example, the cell matrix may include a cell column indicating consecutive symbols of the same virtual reel in addition to the cells indicating a portion of independent virtual reels respectively.

What is claimed is:

1. A game machine, comprising:

a display configured to display a plurality of symbol cells displayed in a grid, the grid having a plurality of virtual reel strips, each virtual reel strip including a plurality of game symbols; and a controller connected to the display, the controller configured to initiate an instance of a game including randomly selecting an identical virtual reel strip from a set of two or more possible identical virtual reel strips and randomly replacing at least two of the virtual reel strips with the selected identical virtual reel strip, the controller further configured to spin and stop the virtual reel strips forming an outcome and to pay an award for a winning symbol combination in the outcome, the outcome including a game symbol in each cell, wherein the controller synchronously spins the identical virtual reel strips such that each identical virtual reel strip displays a same consecutive order of symbols while spinning, and stops the identical virtual reel strips to indicate the same game symbol in the outcome.

2. A game machine, as set forth in claim 1, wherein the identical virtual reel strips are rotated in a manner different than the other virtual reel strips.

3. A game machine, as set forth in claim 2, wherein the identical virtual reel strips are rotated at a different speed than the other virtual reel strips.

4. A game machine, as set forth in claim 2, wherein a start and/or stop time of the identical virtual reel strips is different than a start and/or stop time of the other virtual reel strips.

5. A game machine, as set forth in claim 2, wherein the identical virtual reel strips are rotated for a first time period and the other virtual reel strips are rotated for a second time period.

6. A game machine, as set forth in claim 2, wherein the identical virtual reel strips spin in a first direction and the other virtual reel strips spin in one of the first direction and an opposite direction.

7. A game machine, as set forth in claim 1, wherein the controller displays the outcome by initiating a spin of each displayed virtual reel strip and synchronously spinning the identical virtual reel strips as the other virtual reel strips are spinning.

8. A game machine, as set forth in claim 1, wherein the grid includes a plurality of columns and each cell of the column has an associated reel strip, at least two of the identical virtual reel strips are in the same column.

9. A method of providing a game using a game machine, the game machine including a display and a controller connected to the display, comprising the controller performing the steps of:

initiating an instance a game including displaying a plurality of symbol cells on the display in a grid, the grid having a plurality of virtual reel strips, each virtual reel strip including a plurality of game symbols;

randomly selecting an identical virtual reel strip from a set of two or more possible identical virtual reel strips and randomly replacing at least two of the virtual reel strips with the selected identical virtual reel strip;

spinning and stopping the virtual reel strips forming an outcome, the outcome including a symbol in each cell of the grid; and paying an award for a winning symbol combination in the outcome;

wherein the controller synchronously spins the identical virtual reel strips such that each identical virtual reel strip displays a same consecutive order of symbols while spinning; and wherein the controller stops the identical virtual reel strips to indicate the same game symbol in the outcome.

10. A method, as set forth in claim 9, wherein the identical virtual reel strips are rotated in a manner different than the other virtual reel strips.

11. A method, as set forth in claim 10, wherein the identical virtual reel stripes are rotated at a different speed than the other virtual reel strips.

12. A method, as set forth in claim 10, wherein a start and/or stop time of the identical virtual reel strips is different than a start and/or stop time of the other virtual reel strips.

13. A method, as set forth in claim 10, wherein the identical virtual reel strips are rotated for a first time period and the other virtual reel strips are rotated for a second time period.

14. A method, as set forth in claim 10, wherein the identical virtual reel strips spin in a first direction and the other virtual reel strips spin in one of the first direction and an opposite direction.

15. A method, as set forth in claim 9, further comprising the controller performing the step of displaying the outcome by initiating a spin of each displayed virtual reel strip and synchronously spinning the identical virtual reel strips as the other virtual reel strips are spinning.

16. A method, as set forth in claim 9, wherein the grid includes a plurality of columns and each cell of the column has an associated reel, at least two of the identical virtual reel strips are in the same column.

17. A non-transitory information recording medium containing a computer readable program that causes a game machine to function as a:

a display configured to display a plurality of symbol cells displayed in a grid, the grid having a plurality of virtual reel strips, each virtual reel strip including a plurality of game symbols; and a controller, the controller configured to initiate an instance a game including randomly selecting an identical virtual reel strip from a set of two or more possible identical virtual reel strips and randomly replace at least two of the virtual reel strips with the selected identical virtual reel strip, the controller further configured to spin and stop the virtual reel strips forming an outcome and to pay an award for a winning symbol combination in the outcome, the outcome including a game symbol in each cell, wherein the controller synchronously spins the identical virtual reel strips such that each identical virtual reel strip displays a same consecutive order of symbols while spinning, and stops the identical virtual reel strips to indicate the same game symbol in the outcome.

18. A non-transitory information recording medium containing a computer readable program, as set forth in claim 17, wherein the identical virtual reel strips are rotated in a manner different than the other virtual reel strips.

19. A non-transitory information recording medium containing a computer readable program, as set forth in claim 18, wherein the identical virtual reel strips are rotated at a different speed than the other virtual reel strips.

20. A non-transitory information recording medium containing a computer readable program, as set forth in claim 18, wherein a start and/or stop time of the identical virtual reel strips is different than a start and/or stop time of the other virtual reel strips.

21. A non-transitory information recording medium containing a computer readable program, as set forth in claim 18, wherein the identical virtual reel strips are rotated for a first time period and the other virtual reel strips are rotated for a second time period.

22. A non-transitory information recording medium containing a computer readable program, as set forth in claim 18, wherein the identical virtual reel strips spin in a first direction and the other virtual reel strips spin in one of the first direction and an opposite direction.

23. A non-transitory information recording medium containing a computer readable program, as set forth in claim 17, wherein the controller displays the outcome by initiating a spin of each displayed virtual reel strip and synchronously spinning the identical virtual reel strips as the other virtual reel strips are spinning.

24. A non-transitory information recording medium containing a computer readable program, as set forth in claim 17, wherein the grid includes a plurality of columns and each cell of the column has an associated virtual reel strip, at least two of the identical reel strips are in the same column.

* * * * *